April 21, 1959  R. T. B. DAVISON ET AL  2,883,086
LIQUID DISPENSING ATTACHMENT FOR BOTTLE, WITH MEANS FOR
AUTOMATICALLY MEASURING A CHARGE
UPON INVERSION OF BOTTLE
Filed Dec. 12, 1955  2 Sheets-Sheet 1
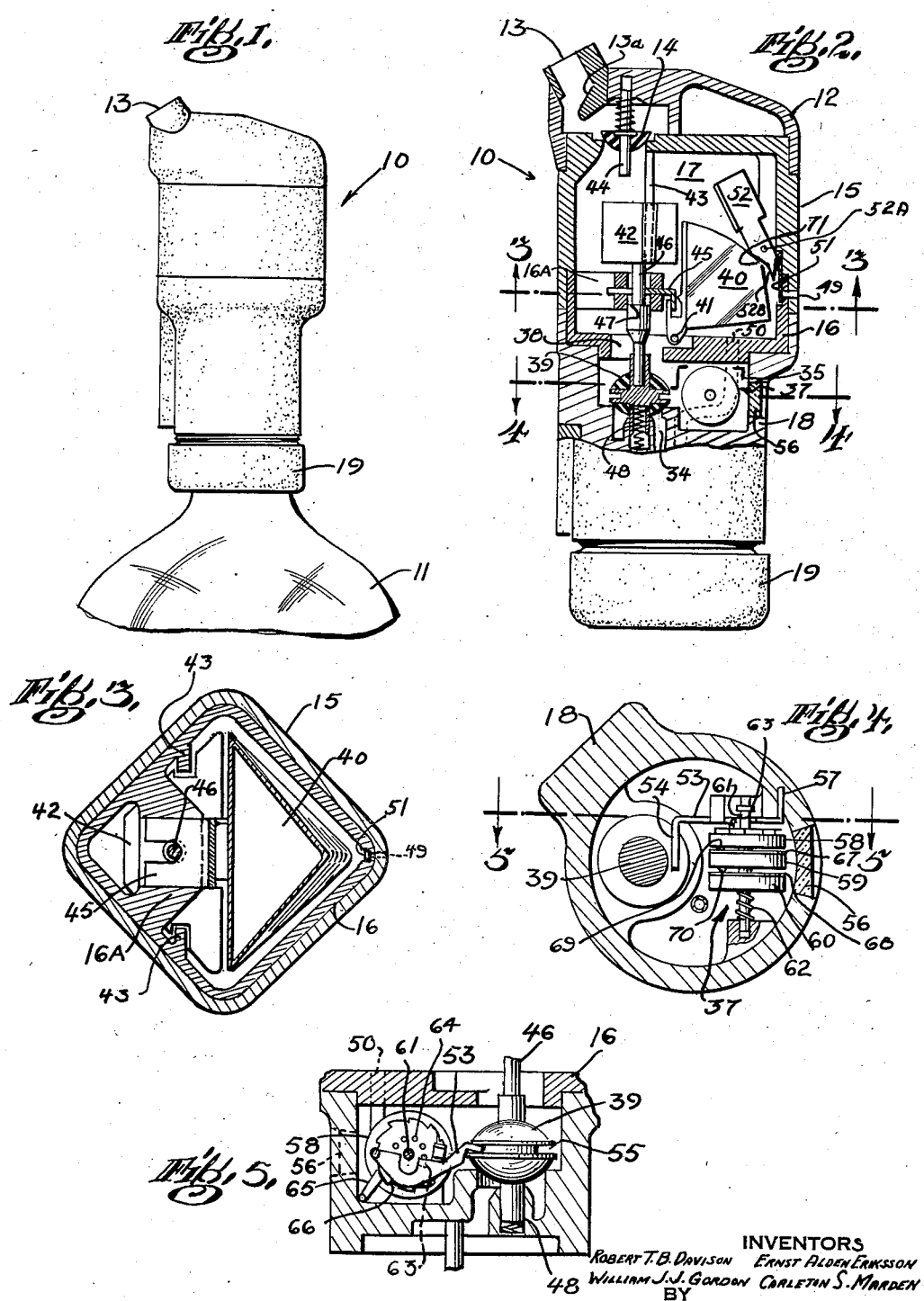
INVENTORS
ROBERT T. B. DAVISON  ERNST ALDEN ERIKSSON
WILLIAM J. J. GORDON  CARLETON S. MARDEN
BY
Pollard Johnston Suny thy Robertson
ATTORNEYS

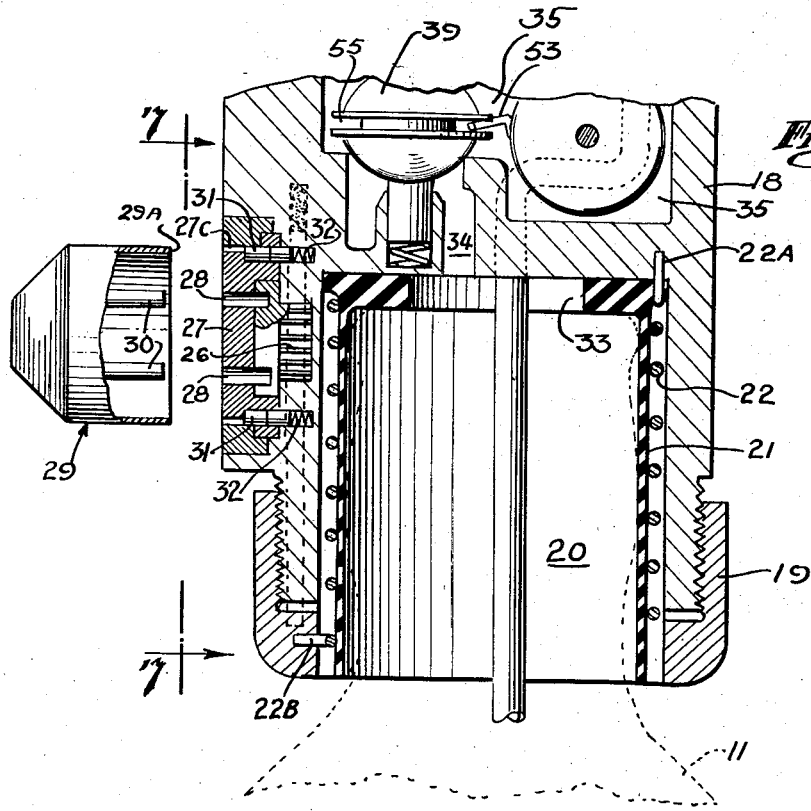
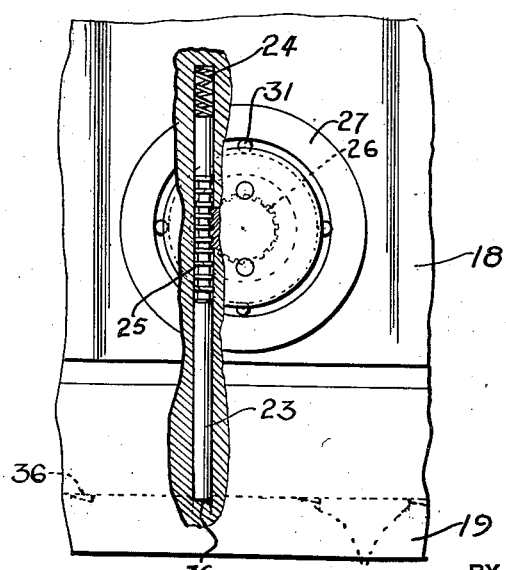

United States Patent Office 2,883,086
Patented Apr. 21, 1959

2,883,086

LIQUID DISPENSING ATTACHMENT FOR BOTTLE, WITH MEANS FOR AUTOMATICALLY MEASURING A CHARGE UPON INVERSION OF BOTTLE

Robert T. B. Davison, Concord, Ernst Alden Eriksson, Lexington, William J. J. Gordon, Cambridge, and Carleton S. Marden, Boston, Mass., assignors, by mesne assignments, to American Machine and Metals, Inc., New York, N.Y., a corporation of Delaware Application December 12, 1955, Serial No. 552,498

12 Claims. (Cl. 222—67)

This invention relates to a device for dispensing liquid in predetermined quantities from a container.

In liquid or material dispensing devices, such as for dispensing of beverages, where it is desired to control the quantity dispensed each time and to record the number of dispensing operations, it is desirable to lock a container having the liquid or material therein to a measuring dispensing device so that it cannot be removed by unauthorized persons. Further, the dispensing device should be one which will accurately measure the liquid and through which the material cannot be withdrawn without registering on an attached counter means.

One of the objects of this invention is to provide a dispenser which will correctly measure and accurately count dispensing operations regardless of the manner in which it is operated.

Another object of this invention is to provide a simple arrangement for locking a container on a dispenser.

A still further object of the invention is to provide a simple beverage dispensing combination which can be locked in place on a bottle or container and from which measured quantities of liquid or material can be dispensed and counted when the bottle is inverted.

In one aspect of the invention, the measuring dispenser includes a casing with a measuring chamber, said chamber having inlet and outlet passages, there being a valve in the inlet to control the flow from a supply container into said casing, and there being a normally closed valve in said outlet. A movable outlet valve operating means, such as a weight movable by gravity, can be provided to open said outlet valve when the dispenser has been inverted, said weight being held in an inoperative position until said chamber has the desired quantity of material or liquid therein. A latch means is arranged to hold said operating means in said inoperative condition until the chamber has the desired amount therein, said latch being released by movement of a liquid responsive means, such as a float in the measuring chamber. When the dispenser is inverted, the inlet valve will open to permit the measuring chamber to fill. When a predetermined amount of liquid is in the chamber, the liquid responsive means will move to release said latch means so that the weight operates to open the outlet valve, the inlet valve at the same time being permitted to close. The inlet valve also may be arranged to close the inlet passage to the measuring chamber when the dispenser is in upright position so as to prevent draining of the contents of the measuring chamber therethrough. A means can be provided to prevent movement or operation of the liquid responsive means unless the dispenser is in a completely inverted position. Further, an air valve can be arranged to permit air to flow into the chamber at appropriate times.

In a further aspect of the invention, a recess can be provided in the dispenser casing to receive a necked outlet of the supply container or bottle. A helical spring is located in said recess, one end or portion of the spring being attached to the casing, the other end or portion spaced from the first mentioned portion and being fastened to a rotatable or movable locking ring. When the neck of the bottle is within said spring and recess, rotation of the ring will wind said spring tightly about the neck so that it cannot be removed from the dispenser. The ring may be locked in place by suitable tumbler or lock means so that a key must be employed to release said ring for container removal purposes.

These and other objects, advantages and features of the invention will become apparent from the following description and drawings which are merely exemplary.

In the drawings:

Fig. 1 is a fragmentary side elevation of a preferred embodiment of the dispenser in place on the top of a bottle or container;

Fig. 2 is an enlarged side elevation partially in section;

Fig. 3 is a horizontal cross section taken along line 3—3 of Fig. 2;

Fig. 4 is a horizontal cross section taken along line 4—4 of Fig. 2;

Fig. 5 is a vertical section taken generally along line 5—5 of Fig. 4;

Fig. 6 is an enlarged fragmentary sectional view of the lower part of the dispenser illustrating the connection with the bottle or container; and Fig. 7 is a fragmentary and partially broken away side elevation taken at line 7—7 of Fig. 6.

The dispenser may include a casing or housing assembly 10 (Fig. 1) adapted to be positioned on the neck of a bottle or container 11 for the material, such as a beverage. The casing 10 may be made of plastic, or a light metal, or any suitable material. In the form shown, the dispenser is small enough to be placed on the neck of a comparatively small bottle or container, and is of the type which is inverted when it is desired to dispense a measured quantity from the container. It is particularly useful in dispensing of beverages such as in a bar or restaurant.

The casing may be made in several portions in order to facilitate assembly and disassembly of the dispenser. Upper portion 12 has a pouring spout 13 and also forms at least part of the support for the normally closed outlet valve 14. An obstruction 13a is located inside the pouring spout to prevent forcing open of outlet valve 14 by an instrument inserted through pouring spout 13. Portion 12 is fitted to upper intermediate portion 15 and portion 15 is in turn fitted to lower intermediate portion 16. Measuring chamber 17 is formed between portions 15 and 16, the effective volume of chamber 17 determining the amount of liquid dispensed at each inversion of the dispenser. By replacing portion 15, for example, with a member of larger or smaller size, the amount of liquid dispensed can be altered. Alternatively, the volume of chamber 17 can be changed by inserting one or more filler plugs (not shown), which can be fastened to one of the walls of chamber 17.

Lowermost portion 18 can be fitted over the bottom of portion 16 so that a smooth joinder with the bottom edge of portion 15 can be effected. This joinder, as well as the other joinders of the casing members, can be accomplished by securing the closely fitting joints by suitable cement. Alternatively, the sections can be held together by one or more long screws (not shown) vertically placed and having their heads located at the bottom edge of portion 18, such location rendering them inaccessible when the dispenser is locked in place on a container.

Rotatably mounted at the bottom of member 18 is locking ring 19 (Figs. 1, 6), said ring being rotatable for securing the dispenser to the container. This ring can threadedly engage portion 18 or can be otherwise rotatably secured thereto.

Recess 20 (Fig. 6) of sufficient depth is provided in the bottom of portion 18 so that the dispenser can be securely attached to the neck of the container. Skirt 21, which may be constructed of a flexible material such as rubber or the like, is provided in the recess to seal the joint between the bottle neck and dispenser casing. Surrounding the skirt is a helical spring 22 having a relatively large number of turns and which generally conforms to the shape of the recess. This spring is secured in aperture 22A in the lowermost portion 18 and in aperture 22B of rotatable ring 19 at a location spaced from 22A. As the ring is rotated in a winding direction, spring 22 will wind up or tighten. If ring 19 is turned in the opposite direction, the spring will unwind. When the ring is rotated in the tightening direction, it will contract inwardly and cause skirt 21 to engage container 11 and to tightly engage the convolutions of the neck of the container, thereby locking the container to the dispenser casing. The spring 22 will readily adapt itself to fit around any neck container contour that is generally circular in cross section.

Preferably, provision is made so that the ring cannot be rotated in the tension-relieving or unwinding direction of the spring except by using a key fitting the particular dispenser. One or more apertures or ratchet teeth 36 (Fig. 7) are located on the bottom inside portion of ring 19, said teeth cooperating with pin 23 biased downwardly by spring 24 so as to normally cause engagement of pin 23 with a mating aperture or tooth of ring 19.

A plurality of annular grooves 25 can be located on pin 23, said grooves forming gear teeth enabling the pin to be raised out of engagement with the apertures or ratchet teeth of the ring upon operation of gear 26. Located outwardly of gear 26 is a gear cover 27 (Fig. 6) which is rotatably secured in portion 18. Spaced holes 28 extend through the gear retainer and into the gear so that these members may be simultaneously rotated by external means inserted therein.

In order to accomplish rotation of gear 26 and raising of pin 23, a fitted key 29 is provided. Key 29 may be generally cup or dome-shaped and may have two spaced inner projections 30 located so as to engage said holes 28. Gear cover 27 has an annular groove 27C so that annular skirt 29A of key 29 can fit therein, skirt 29A being shaped relative to the tumblers 31 so as to move said tumblers inwardly against springs 32 to permit rotation of gear 26 when the correct key is used.

Liquid to be dispensed from bottle 11 can reach the measuring chamber 17 through an aperture 33 (Fig. 6) provided in the top portion of skirt 21, this aperture being in communication with a passage 34 (Figs. 3, 6) in portion 18. Passage 34 leads directly to counter chamber 35, in which is located counter 37. A passage 38 is located in the bottom of section 16, opening into chamber 35 in such a manner as to be aligned with the outlet of passage 34. Because of these openings, the liquid flowing through passage 34 flows through chamber 35 and then into measuring chamber 17, the flow of liquid being controlled by double acting valve 39.

Float 40 (Fig. 2) is pivotally mounted on pin 41 in measuring chamber 17. Weight 42 may be slidably mounted on guides 43 in measuring chamber 17 in such a manner that it may move vertically between the position illustrated in Fig. 2 with valve 39 closing passage 34 to a position contacting stem 44 of the outlet valve 14 when latch 45 is released.

When the dispenser is inverted to dispense liquid from bottle 11, weight 42 will tend to move toward outlet valve 14. Trigger or latch 45 slidably mounted in support 16A will engage shoulder 47 on stem 46 attached to the weight to prevent the weight 42 from dropping until chamber 17 is full. Stem 46 threadedly engages the weight to enable the position of valve 39 with respect to opening 38 properly to be adjusted. Upon inversion of the dispenser, valve 39 first will move to an intermediate position so as to open passage 34 and permit liquid to flow into chamber 17.

When the chamber 17 has a predetermined quantity of liquid therein, float 40 will pivot clockwise about its mounting pin 41 to disengage latch 45 from shoulder 47. This will release weight 42 so that it can move toward and contact valve stem 44 to open valve 14. When weight 42 moves toward valve stem 44, double acting valve 39 will be permitted to move so as to close passage 38 and prevent liquid from entering the chamber. Upon dispenser being restored to an upright position, as shown in Fig. 2, weight 42 moves downwardly again under the influence of gravity so as to open the valve 39 with respect to opening 38 and so as to close passage 34 to prevent draining of chamber 35. It is desirable to prevent liquid in chamber 17 and 35 from returning through passage 34, particularly if the device has been only partially filled and valve 14 has not been opened. The tapered lower portion of shoulder 47 will permit shoulder to move past the latch 45 so that the latch will be automatically reset.

Float lock or latch 52 is pivoted at 52A, the lock 52 having a lock surface 52B arranged to prevent movement of float 45 until the dispenser is substantially completely in its inverted position. When so inverted, float lock 52 will rotate in a clockwise direction (Fig. 2) so as to remove surface 52B from the path of movement of float 40.

It is desirable to permit air to flow into chamber 17 as liquid is dispensed. Casing member 15 can be provided with air passage 49 having check valve 51. Said check valve may be of a leaf type normally biased to closed position. Tube 50 can be provided to permit flow of air into the bottle.

Counter 37 is described and claimed in copending application Serial No. 552,377, filed December 12, 1955. Generally, it may comprise actuating lever 53, said lever being attached to valve 39 for operation thereby, end portion 54 of lever 53 engaging groove 55. Window 56 is provided in the casing so that the counter can be read.

Counter 37 is preferably of a type consisting of a plurality of number wheels mounted on a common shaft and separated from each other by thin non-rotatable plates, 67, 68, each plate having an arcuate aperture of restricted length (not shown) through which a projection 69 on one wheel can engage an aperture or abutment (not shown) on the next wheel and thus drive the next wheel one unit each time the preceding wheel completes a revolution.

The three counter wheels are rotatably mounted upon shaft 61 located in section 18 of the housing, and a spring 62 can be provided to bias number wheels 59 and 60 toward wheel 58, and wheel 58 toward actuating lever 53.

Intermediate the ends of the actuating lever is a sloped lug 63, which contacts pins 64 on the primary counter wheel so as to index it upon operation of valve 39. Each time lug 63 is moved downwardly, its flat surface engages one of the pins 64 and indexes the primary wheel 58 one number. When the actuating lever and the lug are returned upwardly, the sloped surface of the lug rides over that pin of the primary wheel in order that the flat surface of the lug can then engage the next pin. The primary counter wheel cannot be accidentally moved backward by such an upward return movement of the actuating lever because of pawl 65, engaging the teeth 66 of the primary wheel 58.

As mentioned, non-rotatable thin flat separating plates 67 and 68 are next to counter wheels 59 and 60, each plate having an aperture therein of an extent approximately equal to the number of degrees between two adjacent numerals on a counter wheel. In the form shown, primary counter wheel 58 and second counter wheel 59 have small pointed projections 69 and 70, respectively. Each counter wheel 59 and 60 has a series of apertures (not shown) on the side facing counter wheels 58 and 59, respectively, these apertures being evenly spaced and also being located the same radial distance from the shaft 61 as the apertures in the separating plates. The apertures in the counter wheels correspond in their placement to the digits on the faces of the number wheels. For example, in the case of second number wheel 59, as the projection 69 of the primary counter wheel passes over the aperture in separating plate 67, projection 69 will engage one of the apertures on the side of the second number wheel so as to index this wheel one digit or unit. In a similar manner, projection 70 of the second wheel can engage the apertures of the third wheel 60.

It will be understood that details of construction can be varied without departing from the spirit of the invention except as defined in the appended claims.

What is claimed is:

1. In a measured quantity liquid dispenser, the combination including a casing having a measuring chamber with inlet and outlet passages, means for connecting said inlet passage with the liquid to be dispensed, valve means for said inlet passage, normally closed valve means for said outlet passage, inlet and outlet valve operating means operable upon inversion of said casing to open said outlet passage and to close said inlet passage valve means, latch means holding said operating means in inoperative position, and liquid responsive means in said chamber connected to said latch means for releasing said operating means after said chamber has a predetermined quantity of liquid therein upon inversion of the dispenser.

2. In a measured quantity liquid dispenser, the combination including a casing having a measuring chamber with inlet and outlet passages, means for connecting said inlet passage with the liquid to be dispensed, valve means for said inlet passage, normally closed valve means for said outlet passage, inlet and outlet valve operating means operable upon inversion of said casing to open said outlet passage and to close said inlet passage valve means, latch means holding said operating means in inoperative position, float means in said chamber, and connections between said float means and said latch means for releasing said operating means after said chamber has a predetermined quantity of liquid therein upon inversion of the dispenser.

3. In a measured quantity liquid dispenser, the combination including a casing having a measuring chamber with inlet and outlet passages, means for connecting said inlet passage with the liquid to be dispensed, valve means for said inlet passage, normally closed valve means for said outlet passage, inlet and outlet valve gravity movable operating means operable upon inversion of said casing to open said outlet passage and to close said inlet passage valve means, latch means holding said operating means in inoperative position, float means in said chamber, and connections between said float means and said latch means for releasing said operating means after said chamber has a predetermined quantity of liquid therein upon inversion of the dispenser.

4. In a measured quantity liquid dispenser, the combination including a casing having a measuring chamber with inlet and outlet passages, means for connecting said inlet passage with the liquid to be dispensed, inlet valve means in said inlet passage, normally closed outlet valve means in said outlet passage, inlet and outlet valve operating means operable upon inversion of said casing first to open said inlet valve means to fill said chamber and then to open said outlet passage and close said inlet passage valve means which closes the passage to said chamber, latch means holding said operating means from operating said outlet valve means, and float means in said chamber connected to said latch means for releasing said operating means when the chamber is filled following inversion of the dispenser.

5. In a measured quantity liquid dispenser, the combination including a casing having a measuring chamber with inlet and outlet passages, means for connecting said inlet passage with the liquid to be dispensed, inlet valve means, normally closed outlet valve means in said outlet passage, inlet and outlet valve operating means operable upon inversion of said casing to open said outlet passage and to close said inlet passage valve means, said operating means moving upon inversion of said casing so that said inlet valve means will open, latch means holding said operating means from operating said outlet valve means, float means in said chamber connected to said latch means for releasing said operating means when the chamber is filled after inversion of the dispenser, and normally closed air inlet check valve means connected to said chamber.

6. In a measured quantity liquid dispenser, the combination including a casing having a measuring chamber with inlet and outlet passages, means for connecting said inlet passage with the liquid to be dispensed, inlet valve means in said inlet passage, normally closed outlet valve means in said outlet passage, inlet and operating means operable when released upon inversion of said casing to open said outlet passage and to close said inlet passage valve means, latch means holding said operating means from operating said outlet valve means, float means in said chamber connected to said latch means for releasing said operating means when the chamber is filled after inversion of the dispenser, and float blocking means blocking movement of said float unless the casing is substantially completely inverted.

7. A container lock device for a dispenser, said lock device including a casing having an elonagted recess for accommodating the outlet portion of said container, a helical spring inside said recess, said spring conforming generally to the shape of the inner wall of said recess, means affixing one portion of said spring to said casing, and spring tightening means affixed to a portion of said spring spaced from the end thereof attached to said casing, so that when said tightening means is operated in a tightening direction, said spring will tighten about the outlet portion of said container and hold said container on said lock device.

8. A container lock device for a dispenser, said lock device including a casing having an elongated recess for accommodating the outlet portion of said container, a helical spring inside said recess, said spring conforming generally to the shape of the inner wall of said recess, means affixing one portion of said spring to said casing, a flexible cup means in said recess engageable by said spring for gripping said outlet portion, and spring tightening means affixed to a portion of said spring spaced from the end thereof attached to said casing, so that when said tightening means is operated in a tightening direction, said spring will tighten about said cup and said container and hold said container on said lock device.

9. A container holding device for a dispenser, said holding device including a casing having an elongated recess for accommodating the outlet portion of said container, a helical spring inside said recess, said spring conforming generally to the shape of the inner wall of said recess, means affixing one portion of said spring to said casing, spring tightening means affixed to a portion of said spring spaced from the end thereof attached to said casing, so that when said tightening means is operated in a tightening direction, said spring will tighten about the outlet portion of said container and hold said container on said holding device, and means holding said tightening means in locked tightened position.

10. A container holding device for a dispenser, said holding device including a casing having an elongated recess for accommodating the outlet portion of said container, a helical spring inside said recess, said spring conforming generally to the shape of the inner wall of said recess, means affixing one portion of said spring to said casing, spring tightening means affixed to a portion of said spring spaced from the end thereof attached to said casing, so that when said tightening means is operated in a tightening direction, said spring will tighten about the outlet portion of said container and hold said container on said holding device, means holding said tightening means in locked tightened position, and key means for releasing said last mentioned means.

11. A device for dispensing liquid from a bottle, said device including a casing, said casing having an elonagted recess adapted to receive the necked outlet of said bottle, a liquid-receiving chamber formed in said casing, an inlet leading from said recess into said chamber to feed liquid thereto from the bottle, an outlet leading from the casing through which liquid in said chamber can be dispensed, a normally-closed outlet valve in said outlet, an inlet valve in said inlet, movable operating means in said chamber adapted to open said outlet valve and to close said inlet valve, said operating means tending to move upon inversion of the casing to open said outlet valve, a float in said chamber, float operable latch means to releasably restrain said operating means from movement toward said outlet valve, said inlet valve being movable in conjunction with the movement of said operating means when said bottle is inverted, said inlet valve being moved in a closing direction as said operating means moves in a direction to open said outlet valve, so that upon said casing being inverted to fill said chamber with liquid from said bottle, said float will rise to release said operating means, the movement of said operating means causing opening of said outlet valve to dispense liquid from said chamber, clamping means in said recess whereby said casing can be releasably clamped to the necked outlet of said bottle, and key means for releasing said clamping means.

12. A device for dispensing liquid from a bottle, said device including a casing, said casing having an elongated recess to receive the necked outlet of said bottle, a liquid-receiving chamber formed in said casing, an inlet leading from said recess into said chamber to feed liquid thereto from said bottle, an outlet leading from the casing through which liquid in said chamber can be dispensed, a normally-closed outlet valve in said outlet, an inlet valve in said inlet, gravity movable operating means in said chamber for opening said outlet valve and for closing said inlet valve, said operating means tending to move upon an inversion of the casing in a direction to open said outlet valve, float means in said chamber, float releasable latch means releasably holding said operating means from movement toward said outlet valve, said inlet valve being movable in conjunction with the movement of said operating means when said bottle is inverted, said inlet valve being moved in the closing direction as said operating means moves in a direction to open said outlet valve, so that said chamber is filled with liquid from said bottle upon inversion of the casing, said float rising and releasing said operating means, the resulting movement of said operating means opening said outlet valve to dispense liquid, a helical spring within said recess for embracing the neck of a bottle, said spring having an end portion affixed to said casing, a lockable spring tightening means affixed to another end portion of said spring for tightening said spring around the neck of a bottle, and key releasable means holding said tightening means in a tightened position.

References Cited in the file of this patent
UNITED STATES PATENTS

| | | |
|---|---|---|
| 420,918 | Noack | Feb. 4, 1890 |
| 2,363,747 | Reece et al. | Nov. 28, 1944 |
| 2,546,194 | Livadas | Mar. 27, 1951 |
| 2,566,669 | Lesnick | Sept. 4, 1951 |
| 2,601,353 | Woodward | June 24, 1952 |
| 2,605,931 | Scannell et al. | Aug. 5, 1952 |
| 2,620,947 | Kucki | Dec. 9, 1952 |
| 2,625,303 | Mays | Jan. 13, 1953 |
| 2,631,755 | Woodward | Mar. 17, 1953 |
| 2,661,867 | Christbeck et al. | Dec. 8, 1953 |
| 2,728,490 | Scannell et al. | Dec. 27, 1955 |

UNITED STATES PATENT OFFICE

CERTIFICATE OF CORRECTION

Patent No. 2,883,086                                          April 21, 1959

Robert T. B. Davison et al.

It is hereby certified that error appears in the printed specification of the above numbered patent requiring correction and that the said Letters Patent should read as corrected below.

Column 6, line 22, after "and" insert -- outlet valve --; line 33, for "elonagted" read -- elongated --.

Signed and sealed this 13th day of October 1959.

(SEAL)
Attest:

KARL H. AXLINE                                    ROBERT C. WATSON
Attesting Officer                                 Commissioner of Patents